United States Patent [19]

Burnell et al.

[11] 4,140,651

[45] Feb. 20, 1979

[54] CONTROL OF NITROGEN OXIDES FROM STATIONARY SOURCE EFFLUENTS

[75] Inventors: Laurence K. Burnell; James D. Hyde, both of Troy; Nicholas P. Kolak, Latham; Richard E. Gibbs, Troy, all of N.Y.

[73] Assignee: Nox Research Corp., New York, N.Y.

[21] Appl. No.: 792,473

[22] Filed: Apr. 29, 1977

[51] Int. Cl.² ............................................. C09K 3/00
[52] U.S. Cl. ................................. 252/188; 423/239; 423/235
[58] Field of Search ................ 252/188; 423/239, 235, 423/236

[56] References Cited

U.S. PATENT DOCUMENTS 2,995,522   8/1961   Joyce ............................. 252/188 X Primary Examiner—Stephen J. Lechert, Jr.
Attorney, Agent, or Firm—Sherman & Shalloway

[57] ABSTRACT

A scrubbing solution and process of use thereof, for removing nitrogen oxides from gaseous effluents from stationary sources comprising a source of sulfite anion, a basic compound, an organic surface-active agent, and water.

9 Claims, 4 Drawing Figures

CONTROL OF NITROGEN OXIDES FROM STATIONARY SOURCE EFFLUENTS

BACKGROUND OF THE INVENTION

This invention relates to a scrubbing solution and a process of use thereof for the removal of nitrogen oxides from the effluents of combustion processes. More particularly, this invention relates to a scrubbing solution and process of use thereof for removal of nitrogen oxides from the gaseous effluents of combustion processes utilizing gas-liquid absorption.

As a result of recent concern and regulations regarding air pollution, many attempts have been made to reduce the amount of nitrogen oxides which enter the atmosphere. However, in spite of these attempts, it is estimated that over 20 million tons of nitrogen oxides are emitted to the atmosphere in the United States every year. Of this amount, over half is due to stationary sources such as electric power plants, industrial combustion or gas plants. In these combustion processes, the nitrogen present in the air combines with the oxygen to produce varying amounts of nitrogen oxides, including nitric oxide and nitrogen dioxide.

The continued emission of these nitrogen oxides into the air is of grave national concern, since it has been shown that even low levels of these oxides in the air have detrimental effects on health. Natural background levels of 1 part per billion have been supplemented with an average urban level of 10–50 parts per hundred million. Since stack gas from typical stationary combustion sources, as noted above, contains from 100–1500 parts per million of nitrogen oxides, efforts must be made to reduce the level of nitrogen oxide emissions from these combustion processes, which are necessary to our daily national existence. Furthermore, the nitrogen oxide pollutants react with other pollutants, such as sulphur oxides and hydrocarbons, in the atmosphere to form the now common smog of the larger industrial centers. Although smog was once only a problem of the largest and most densely populated national urban centers, the general background level has been raised sufficiently in past years that it is becoming a problem even in areas of the country which are not industrially developed.

Although there are other sources for the production of energy and power which can eventually replace fossil fuel power stations, it is estimated that it will be a number of decades before these power sources can be economically used and that, until that time, at least 100 and possibly 300 new fossil fuel combustion stations will be built for the generation of electricity alone. Therefore, it is vitally important that a method be developed for controlling nitrogen oxide pollutants from present sources of combustion power and fossil fuel power stations which will be built in the next 20 years. This fact alone has given increased impetus to the research surrounding the elimination of nitrogen oxides from power plants and other combustion process emissions.

There are two general approaches for the elimination of nitrogen oxide emissions from power plant stack gases. One approach is to modify the combustion process so that nitrogen oxides are not produced in sufficient quantities to cause harm. However, this approach is not practical with respect to the numerous power stations which are already in operation, since these modifications would require extensive capital improvements and other changes which would make cost of such procedures prohibitive. The second alternative is, by far, the most practical commercially, since a process for the removal of nitrogen oxides can be adapted to any existing power plant with a mininum of expense and capital improvement. With regard to the second method, namely, the removal of the nitrogen oxide pollutants from the exit streams of these power sources, a number of possible methods for the removal have been proposed: the use of a reducing gas to reduce nitrogen oxides to nitrogen; the use of gas-permeable membranes which are selective for the specific pollutant; the use of an electric arc which, when passed through an atmosphere of nitrogen, produces atomic nitrogen which would react with the nitrogen oxides to produce nitrogen and oxygen; the use of various complexing agents which form complex ions with the nitrogen oxides in the flue gas; the use of solid adsorbants which adsorb the nitrogen oxides from the flue gas; the use of a catalyst with or without a reducing agent; and, finally, the use of a liquid solution to absorb the nitrogen oxides from the flue gas.

The use of solid adsorption to remove nitrogen oxides from flue gases is not a new idea, since well-known processes for the production of nitric acid rely on the adsorption of nitrogen oxides on silica gel. However, although these solids are active and remove the majority of the nitrogen oxides from the flue gases, they are often poisoned by other pollutants and also are easily saturated when the nitrogen oxides are present in excess of 1000 parts per million in the gas stream.

PRIOR ART REFERENCES

A major effort toward abatement of nitrogen oxide pollution has been concentrated in the area of the use of various liquid solutions to remove the nitrogen oxides from flue gases. In U.S. Pat. Nos. 3,044,844 and 3,044,853, processes are disclosed for the removal of nitrogen oxides from gases containing the same, utilizing a mixture of an electron donor compound and from 2–25% water. Although the processes disclosed in the above two patents have generally been somewhat successful, since these processes remove a significant portion of the nitrogen oxides present in flue gases, it has been found that the results which are obtained utilizing these processes can be immensely improved using the process of the present invention.

U.S. Pat. No. 1,029,528 is directed to a nitrogen oxide removal process which comprises introducing, as a mist or spray, a suspension of an absorbent into a nitrogen oxide-containing gaseous mixture. Suitable absorbents include oxides, hydroxides, and carbonates of alkaline earth metals, with milk of lime being preferred. This patent does not teach using a mixture comprising an alkali metal hydroxide, an alkali metal sulfite, and a surface-active agent as the nitrogen oxide absorbent.

U.S. Pat. No. 3,348,914 discloses a method for recovering nitrogen oxides from industrial gaseous effluents. The method comprises scrubbing the nitrogen oxide-containing gaseous effluents with an aqueous suspension of calcium hydroxide to form calcium nitrite and calcium nitrate. Sulfuric acid is added to the calcium compounds to evolve nitric oxide. The use of alkali metal hydroxide in combination with alkali metal sulfite and a surface-active agent is not disclosed in this patent.

U.S. Pat. No. 3,329,478 is directed to a method of removing nitrogen oxides from gases. A gaseous mixture containing less than 0.5 volume percent of nitrogen oxide having an oxidation degree of greater than 2 is contacted with an aqueous solution of ammonium sulfite and bisulfite, the molar ratio of bisulfite to sulfite being within the range of 0.1 to 0.4. The combination of an alkali metal hydroxide, an alkali metal sulfite, and a surface-active agent for removing nitrogen oxides is not disclosed in this patent.

U.S. Pat. No. 3,784,478 discloses a process for the removal of nitrogen oxides from the effluents of combustion processes. A gaseous mixture containing nitrogen oxide is contacted with a three-component system comprising an electron donor compound, an alkali compound, and water. Suitable electron donor compounds include glycol ethers, alkyl sulfoxides, alkyl phosphates, aryl phosphates, dialkylamides, and phosphoramides. However, this patent does not disclose the use of alkali metal sulfite as a part of the nitrogen oxide removal system.

BRIEF SUMMARY OF THE INVENTION

Briefly, the composition of the present invention comprises an improvement over those disclosed in the above-noted patents. A scrubbing solution containing a surface-active agent, a basic compound, a source of sulfite anion, and water is utilized in the present invention as the liquid absorbent/reactant. It has been found that compositions containing the above four classes of compounds have immensely improved scrubbing characteristics for the nitrogen oxides present in the effluent stream than the water-base-sulfite system and the water-surface-active agent system. It has, therefore, been found that the combination of the surface-active agent, the basic compound, the sulfite anion source, and water produces a synergistic effect for the scrubbing of nitrogen oxide pollutants present in stack gases.

BRIEF DESCRIPTION OF THE DRAWINGS

The present invention will now be more fully described by reference to the drawings, wherein.

DETAILED DESCRIPTION OF THE INVENTION

Figure 1:
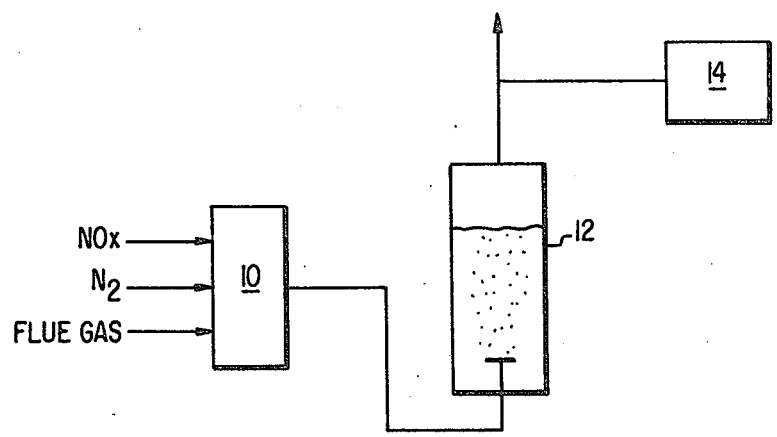
FIG. 1 shows the apparatus used in Examples 1–17.

The present invention provides an improved scrubbing solution and process of use thereof for the removal of nitrogen oxides from flue gases using a liquid solution composition comprising water, a basic compound, a source of sulfite anion, and a surface-active compound.

The present invention comprises an improved process and composition for the absorption/reaction of nitrogen oxides, such as nitric oxide, nitrogen dioxide, nitrogen trioxide, and nitrogen tetroxide, individually or in combination, from flue and stack gases from stationary combustion processes and other similar processes comprising contacting these nitrogen oxide-containing flue gases with a scrubbing solution comprising a surface-active compound, a basic compound, a source of sulfite anion, and water, as an absorbing/reacting agent for the nitrogen-containing compounds.

The scrubbing efficiency of the process of the present invention is higher than that of prior art processes employing basic materials and water or base-sulfite and water. The solution of the present invention utilizes a four-component system which has increased efficiency over compositions utilizing three, two or one of the above-noted absorbents.

The choice of the surface-active compounds is not particularly restricted. The surface-active compound may be cationic, anionic, nonionic, or ampholytic. Surface-active compounds which are useful in the present invention include: dimethyl sulfone; 2,2', 2"-nitrilotriethanol; bis[2-(2-methoxyethoxy)ethyl]ether; 1,2-bis-(2-methoxyethoxy)ethane; sodium dodecylbenzenesulfonate; octanoic acid; dodecylamine perchlorate; and Triton X-100 (a trademark of Rohm and Haas) which is a polyoxyethylene alkylphenol having the general formula

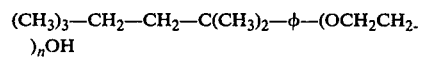

where n is from 8 to 12, and $\phi$ is phenyl. Particularly useful are dimethylsulfone; 2,2',2"-nitrilotriethanol; 1,2-bis(2-methoxyethoxy)ethane; octanoic acid; and Triton X-100.

Basic compounds suitable for use in the present invention may be any inorganic basic compounds. Of particular use are alkali metal hydroxides, alkali metal oxides, and alkali metal carbonates; alkaline earth metal hydroxides, alkaline earth metal oxides, and alkaline earth metal carbonates; and ammonium hydroxide, and ammonium carbonate. Among the above-listed basic compounds, the hydroxides and carbonates of alkali metals, alkaline earth metals, and ammonia are preferred. Useful alkali metals include sodium, potassium, and lithium. Useful alkaline earth metals include barium and calcium. Specific examples of preferred basic compounds include sodium hydroxide, sodium carbonate, calcium carbonate, and ammonium carbonate, with sodium hydroxide being specifically preferred.

The sulfite anion source may be selected from the sulfite of alkali metals, alkaline earth metals, magnesium and ammonia. Alkali metals include sodium, potassium, and lithium. Alkaline earth metals include calcium and barium. Specific examples of the anion source include sodium sulfite, potassium sulfite, magnesium sulfite, calcium sulfite, barium sulfite, and ammonium sulfite. Among these sulfites, alkali metal sulfites are preferred, with sodium sulfite being most preferred.

Our experiments have shown that the anion source may be bisulfite instead of sulfite. However, it should be noted that sulfates are not operative in the present invention.

In the scrubbing solution of the present invention, the amounts of the basic compound range from about 0.01 molar to about 2 molar. However, the concentration of the basic compound should not exceed 1 M since the excess may reduce the efficacy of the scrubbing solution. A preferred concentration of the basic compound is about 0.2 molar.

For the sulfite anion source, its concentration in the scrubbing solution ranges from about 0.05 molar to about 2 molar, with about 0.2 molar to about 1 molar being preferred.

The amount of the surface-active agent present in the scrubbing solution of the present invention ranges from about $5 \times 10^{-4}\%$ to about 5% by weight of the solution, with preferred concentrations depending on the specific surface active agent.

The method of preparing the scrubbing solution of the present invention is not particularly restricted. Known quantities of the basic compound, the sulfite anion source, and the surface-active agent may be added to a measured quantity of water so that the concentration of each of the components is within those disclosed hereinabove. The individual components may be added in any sequence. For example, weighed quantities of the basic compound, the sulfite or bisulfite source, and the surface-active agent may be added sequentially or simultaneously to a known amount of water. Alternatively, measured volumes of the aqueous solutions of the basic compound and the sulfite anion source may be mixed, with the surface-active agent being added after or during the mixing. However, care should be taken when sodium hydroxide is used as the basic compound. As is well known, the solution of solid sodium hydroxide in water is exothermic. In the instance where sodium hydroxide is first added to water, the resultant solution should be cooled to room temperature prior to the addition of the sulfite source compound and the surface-active agent in order to prevent the oxidation of the sulfite source.

It has been found that high temperatures have an adverse effect on the efficacy of the scrubbing solution of the present invention. Generally, the scrubbing solution may be used to contact nitrogen oxide carrying flue gases at a solution temperature of from about 25° C. to about 100° C., although a range of from about 25° C. to about 60° C. is preferred. It is noted that, in the present state of the art, hot flue gases are usually sprayed with cold water to cool the gases to a temperature near the dew point, which is about 56° C., to facilitate subsequent scrubbing operations. Thus, the scrubbing solution of the present invention is most applicable to contacting with water-sprayed flue gases.

The scrubbing solution of this invention may be used to remove nitrogen oxide contaminants in any conventional gas-liquid contacting apparatus, such as packed columns, spray towers, bubble tray columns, and venturi scrubbers. In general, the scrubbing solution is contacted with the flue gases immediately prior to the discharge of the gases to the atmosphere.

ILLUSTRATIVE EXAMPLES

The present invention will be illustrated by the following examples, which are not to be taken as limiting.

EXAMPLES 1–9

The bench scale gas-scrubbing equipment shown in FIG. 1 was used to determine the ability of scrubbing solutions to remove nitrogen oxides. In FIG. 1, known quantities of nitrogen oxides were blended with nitrogen in blender 10. The gas mixture was then bubbled through a volume of the scrubbing solution in cell 12 which comprises a fritted glass dispersion cylinder. The reaction was conducted at room temperature. The concentrations of the nitrogen oxides leaving the cell 12 were measured and recorded by means of a Model 10A Chemiluminescent $NO_x$ Detector (product of Thermo Electron Corp. Waltham, Mass.) 14. The experiments shown in Table I were conducted.

Table I
EFFECTS OF SURFACE-ACTIVE AGENTS ON NITROGEN OXIDE REMOVAL

Scrubbing Solution = 10ml solution of: 0.2M NaOH, 0.2M $Na_2SO_3$, and surface-active agents
Concentration of $NO_x$ at inlet: 800 ppm
Flow rate of flue gas = 100 ml/min.

| Example | Surface-Active Agent | Concentration of Surface-Active Agent (Wt. %) | % $NO_x$ Removed |
|---|---|---|---|
| 1 | dimethylsulfone | 2 | 68 |
| 2 | 2,2′,2″-nitrilotriethanol | 2 | 70 |
| 3 | bis(2-(2-methoxyethoxy)ethyl)ether | 2 | 58 |
| 4 | 1,2-bis(2-methoxyethoxy)ethane | 5 | 71 |
| 5 | sodium dodecylbenzenesulfonate | $1.25 \times 10^{-3}$ | 57 |
| 6 | octanoic acid | 1 | 67 |
| 7 | dodecylamine perchlorate | $5 \times 10^{-4}$ | 44 |
| 8 | Triton X-100* | $6 \times 10^{-4}$ | 63 |
| 9 | none | 0 | 33–39 |

*(Product of Rohm & Haas)

EXAMPLES 10–13

The bench scale equipment shown in FIG. 1 was used to obtain data with respect to the removal of nitric oxide. A gas containing 2032 ppm nitric oxide in nitrogen was passed at room temperature at a rate of 350 ml/min. through 10 ml of the scrubbing solutions shown in Table II.

Table II

| Example | Scrubbing Solution (10 ml total volume) | NO Removal % of Nitric Oxide (NO) Removal |
|---|---|---|
| 10 | water | 4.5 |
| 11 | 2 wt. % dimethylsufone aqueous | 3.1 |
| 12 | 0.2M NaOH, 1M $Na_2SO_3$ | 35.3 |
| 13 | 0.2M NaOH, 1M $Na_2SO_3$, 2 wt. % dimethylsulfone | 56.9 |

The following examples were carried out to show improvement over the prior art.

EXAMPLES 14–17

The apparatus shown in FIG. 1 was used. The nitrogen oxide carrying gas mixture was bubbled at a rate of 100 ml/min. through 10 ml of the scrubbing solutions shown in Table III. The gas mixture contained about 800 ppm of nitric oxide. The experiments were conducted at room temperature.

Table III
Comparison with Prior Art

| Example | Scrubbing Solution | % of Nitric Oxide (NO) Removal |
|---|---|---|
| 15 | U.S. Pat. 1,029,528 0.1M milk of lime 0.2M calcium sulfite | 3.0 |
| 16 | U.S. Pat. 1,029,528 + electron donor of U.S. Pat. 3,784,478 0.1M milk of lime 0.2M calcium sulfite 2% w/w tetraethylene glycol dimethyl ether | 3.5 |
| 17 | Present Invention 0.2M sodium hydroxide 0.2M sodium sulfite 2% dimethylsulfone | 69 |

EXAMPLES 18–20

In these examples, a gas containing 500 ppm of nitric oxide was bubbled at room temperature through 10 ml of scrubbing solution, utilizing the apparatus shown in FIG. 1. The results are summarized in Table IV.

Table IV

| Example | Scrubbing Solution (10 ml total volume) | % of Nitric Oxide (NO) Removal |
|---|---|---|
| 18 | water | 0 |
| 19 | 1M sodium sulfite 1M sodium hydroxide | 26 |
| 20 | 1M sodium hydroxide 1M sodium sulfite 1 wt. % dimethylsulfone | 53 |

The following examples illustrate the effectiveness of the scrubbing solution of the present invention for the removal of nitrogen oxides in a packed column. The apparatus utilized is illustrated in FIG. 2.

Figure 2:
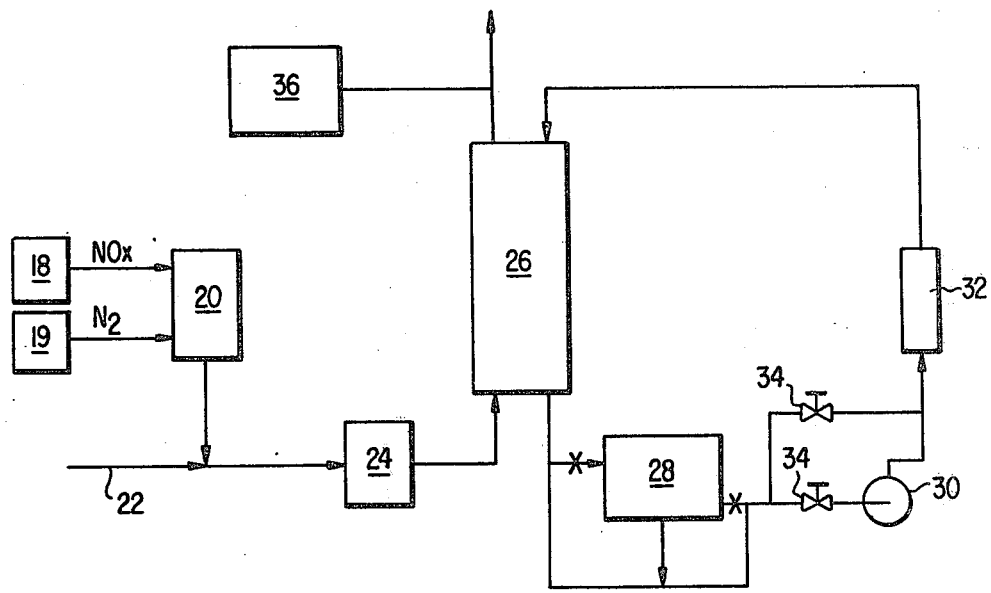
FIG. 2 shows the apparatus used in Example 21.

In FIG. 2, a specific quantity of nitrogen dioxide and nitric oxide in a nitrogen carrier gas from tanks 18, 19 were blended at 20 in known proportions and introduced into the flue gas stream 22. This flue gas of known pollutant composition was drawn by a blower 24 and was fed to the bottom of scrubbing column 26 and counter-currently contacted the scrubbing solution. The scrubbing column 26 comprised a 3-inch diameter packed column filled with Hyperfil Packing (product of Chem Pro Equipment Corp, Hanover, N.J.). Scrubbing liquid exiting at the bottom of the column was returned to the top of the column by recirculating pump 30. The flow rate of the liquid was measured by rotameter 32 and controlled by valves 34 in the pump assembly. The concentrations of NO and $NO_2$ at the inlet and outlet of the packed column scrubber were monitered by a Thermoelectron Model 10A $NO_x$ Detector 36.

EXAMPLE 21

Experiments were conducted utilizing the apparatus of FIG. 2 at various liquid/gas (L/G) ratios so as to test the effectiveness of the scrubbing solution of the present invention. Typical results are illustrated in Table V, results with regard to water alone also being set forth for comparison purposes.

Table V

| Typical results in utilizing a packed column Nitric oxide concentration at inlet = 500 ppm | | |
|---|---|---|
| | % NO Reduction | |
| Scrubbing Solution | L/G = 100 | L/G = 200 |
| water | 1 | 2 |
| 0.2M NaOH 1.0M $Na_2SO_3$ 2 wt. % dimethylsulfone | 27 | 42 |

Figure 3:
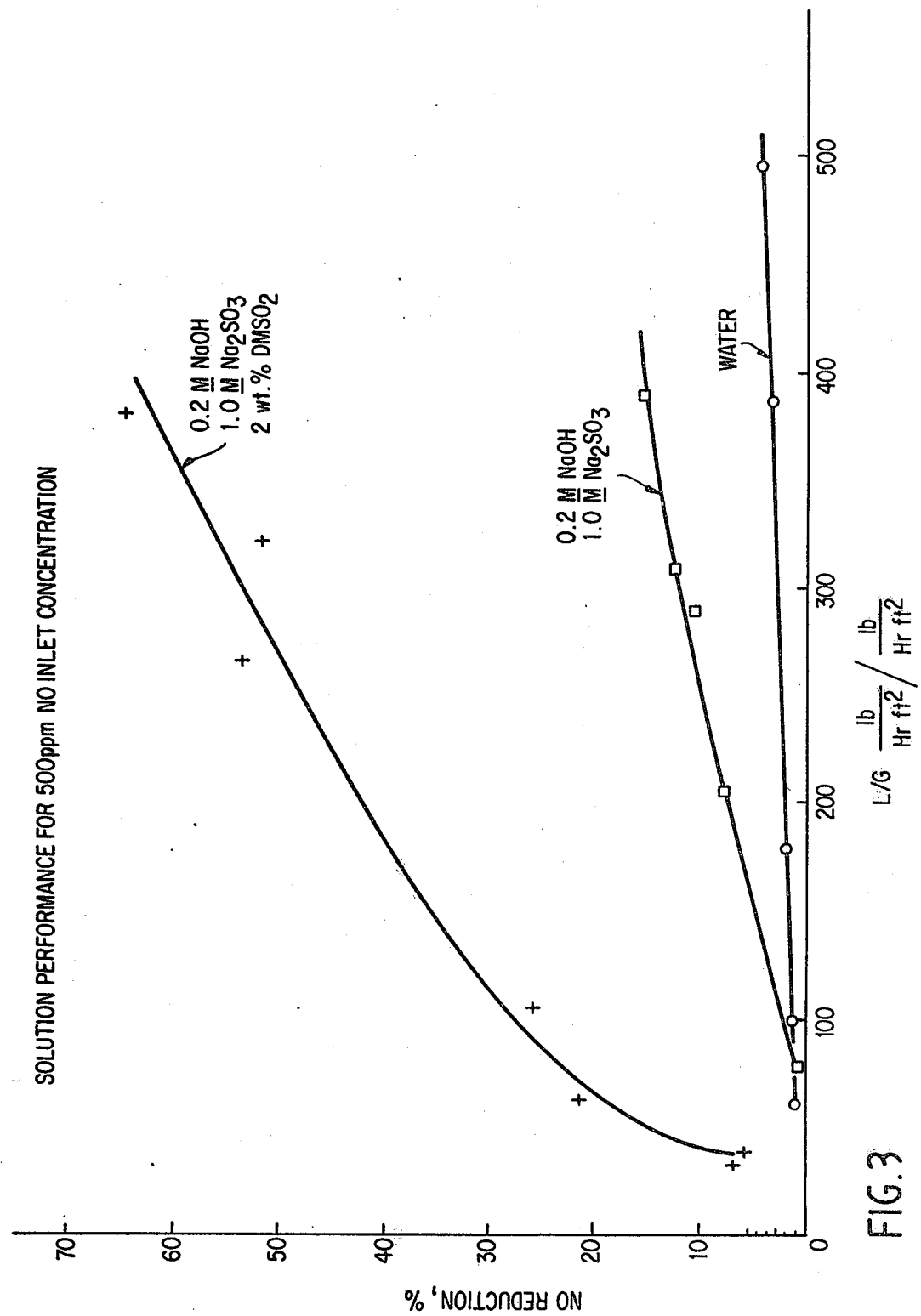
FIG. 3 shows part of the results in Example 21.

The results obtained by using a test solution for 500 ppm NO inlet concentration at various L/G ratios are shown in FIG. 3, where % NO reduction as a function of L/G ratio is plotted. For purposes of comparison, the results of test solutions containing no surface-active agent are also shown. The results of FIG. 3 clearly illustrate the superiority of the scrubbing composition of the present invention.

Figure 4:
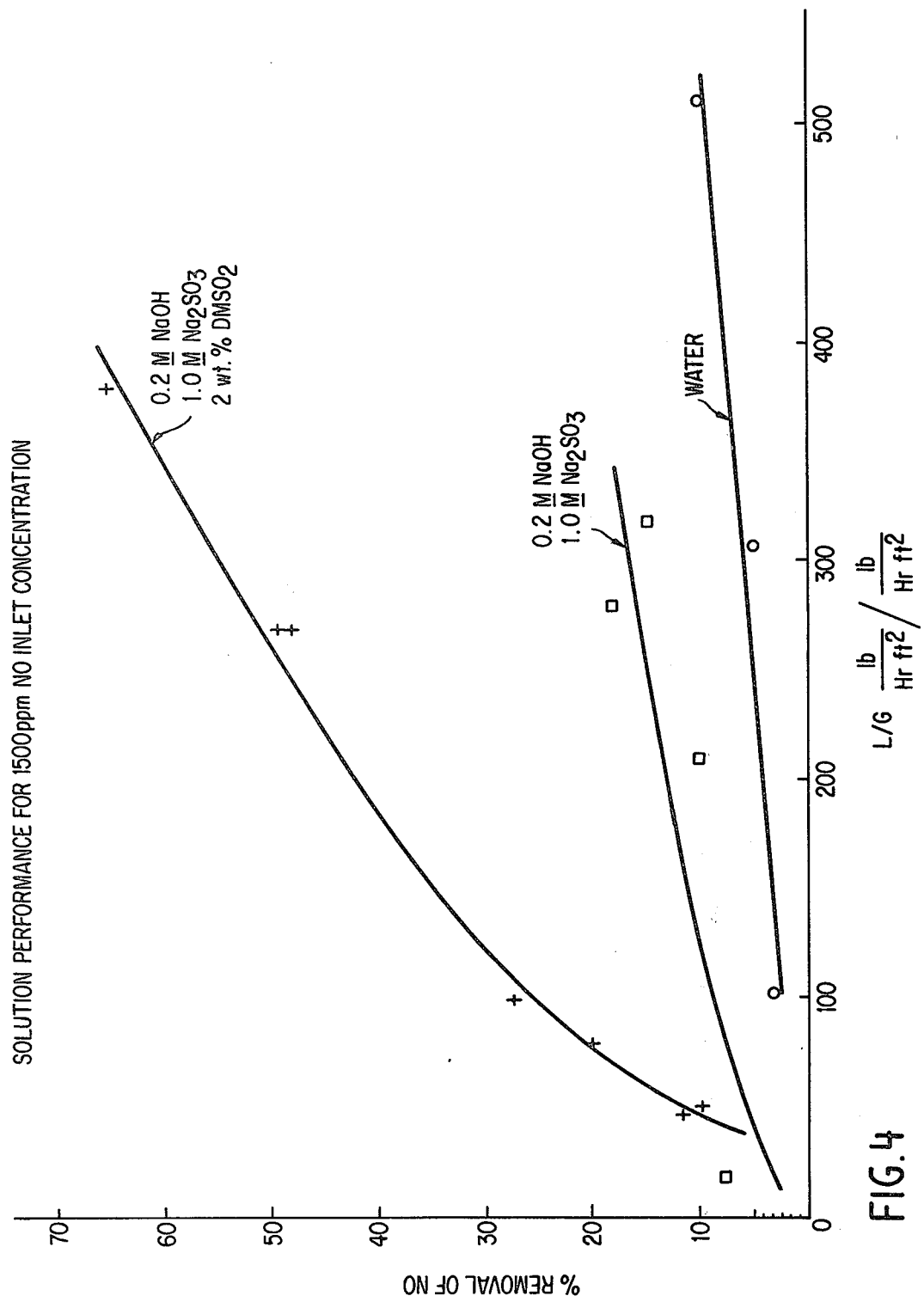
FIG. 4 shows part of the results in Example 21.

FIG. 4 shows the results obtained by using a test solution for 1500 ppm NO inlet concentration at different L/G ratios. Again, it is seen that the scrubbing solution of the present invention produced superior results.

While the process of the present invention has been described by way of the foregoing general examples, the discussion of these results is for the purpose of illustration only and is in no way to limit the scope of the present invention which is properly defined by the appended claims.

We claim:

1. A scrubbing solution for removing nitrogen oxides from nitrogen oxide-carrying flue gases consisting essentially of: from about 0.01 molar to about 2 molar of an inorganic basic compound; from about 0.05 molar to about 2 molar of a sulfite anion source; from about 5 × $10^{-4}$% to about 5% by weight of the solution of a surface-active agent selected from the group consisting of cationic, anionic, nonionic, and ampholytic surface-active agents; and water.

2. The solution of claim 1, wherein the basic compound is selected from the group consisting of alkali metal hydroxides, alkali metal oxides, alkali metal carbonates, alkaline earth metal hydroxides, alkaline earth metal oxides, alkaline earth metal carbonates, ammonium hydroxide, and ammonium carbonate.

3. The solution of claim 1, wherein the anion source is selected from the group consisting of alkali metal sulfites, alkaline earth metal sulfites, magnesium sulfites, and ammonium sulfites.

4. The solution of claim 1, wherein the surface-active agent is selected from the group consisting of dimethyl sulfone; 2,2',2''-nitrilotriethane; bis-[2-(2-methoxyethoxy)-ethyl]ether; 1,2-bis(2-methoxyethoxy)ethane; sodium dodecylbenzenesulfonate; octanoic acid; dodecylamine perchlorate; and a polyoxyethylene alkylphenol having the general formula

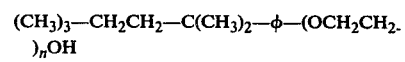

$(CH_3)_3$—$CH_2CH_2$—$C(CH_3)_2$—$\phi$—$(OCH_2CH_2)_n$OH where n is from 8 to 12, and $\phi$ is phenyl.

5. The solution of claim 1, wherein the basic compound has a concentration of about 0.2 molar.

6. The solution of claim 1, wherein the anion source has a concentration of from about 0.2 molar to about 1 molar.

7. The solution of claim 2, wherein the basic compound is selected from the group consisting of sodium hydroxide, calcium hydroxide, ammonium hydroxide, sodium carbonate, calcium carbonate, and ammonium carbonate.

8. The solution of claim 3, wherein the anion source is selected from the group consisting of sodium sulfite, potassium sulfite, and lithium sulfite.

9. The solution of claim 1, wherein the anion source is bisulfite.

* * * * *